US008953291B2

(12) United States Patent
Mi et al.

(10) Patent No.: US 8,953,291 B2
(45) Date of Patent: Feb. 10, 2015

(54) REVERSAL CONNECTION PROTECTING CIRCUIT

(75) Inventors: Yaozhong Mi, Shenzhen (CN); Xiangjun Dai, Shenzhen (CN); Qingfei Zheng, Shenzhen (CN); Mingxing Li, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 826 days.

(21) Appl. No.: 13/059,638

(22) PCT Filed: Sep. 3, 2009

(86) PCT No.: PCT/CN2009/073722
§ 371 (c)(1),
(2), (4) Date: Feb. 17, 2011

(87) PCT Pub. No.: WO2010/028579
PCT Pub. Date: Mar. 18, 2010

(65) Prior Publication Data
US 2011/0141632 A1    Jun. 16, 2011

(30) Foreign Application Priority Data
Sep. 9, 2008    (CN) .................. 2008 2 0147332 U

(51) Int. Cl.
*H02H 3/00* (2006.01)
*H02J 7/00* (2006.01)
(52) U.S. Cl.
CPC .................... *H02J 7/0034* (2013.01)
USPC .......................................... 361/84

(58) Field of Classification Search
USPC ..................................... 361/77, 84
See application file for complete search history.

(56) References Cited

U.S. PATENT DOCUMENTS

| 5,519,557 | A | * | 5/1996 | Kopera et al. ............. 361/84 |
| 5,623,550 | A | * | 4/1997 | Killion ............. 381/322 |
| 2003/0184937 | A1 | * | 10/2003 | Kanouda et al. ............. 361/90 |
| 2004/0145846 | A1 | * | 7/2004 | Fasano et al. ............. 361/102 |
| 2008/0203991 | A1 | * | 8/2008 | Williams ............. 323/288 |

FOREIGN PATENT DOCUMENTS

CN    201270416 Y  *  7/2009
JP    07241030 A   *  9/1995

OTHER PUBLICATIONS

WIPO Application No. PCT/CN2009/073722, International Search Report and Written Opinion of the International Searching Authority, mailed Dec. 10, 2009.*

* cited by examiner

*Primary Examiner* — Jared Fureman
*Assistant Examiner* — Ann Hoang
(74) *Attorney, Agent, or Firm* — Alston & Bird LLP

(57) ABSTRACT

The present invention discloses a reversal connection protecting circuit. The reversal connection protecting circuit includes a power supply interface, a secondary battery, a reversal connection driving unit and a power switching unit. The reversal connection protecting circuit further includes an anti-reversal unit. And the reversal connection protecting circuit further includes a processing unit and a warning interface. According to the present invention, the inconvenience brought by substituting a fuse that is melted in a protecting circuit under the condition that the power supply of the protecting circuit is reversely connected in prior art is overcome.

13 Claims, 2 Drawing Sheets

REVERSAL CONNECTION PROTECTING CIRCUIT

CROSS REFERENCE TO RELATED APPLICATION

This application claims priority to International Application No. PCT/CN2009/073722, filed on Sep. 3, 2009, which claims priority to Chinese Patent Application No. 200820147332.2, filed on Sep. 9, 2008.

FIELD OF THE INVENTION

The present invention relates to electronic circuits field, more particular to a reversal connection protecting circuit.

BACKGROUND OF THE INVENTION

Continuous power supplying is very important to many electronic equipments, especially to communication systems, internet servers etc. When the unexpected event results in power supply interruption, the backup power has to be activated by protecting circuit. Therefore, the power supplying for protecting circuit is especially important. At present, the combination of transient voltage suppressor (TVS) and fuse is used for protecting the circuit when the power supply is reversed. But the fuse is broken after once protection, and it must be replaced for using next time. The maintenance is inconvenience.

SUMMARY OF THE INVENTION

In viewing thereof, the present invention is directed to solve at least one of the problems existing in the prior art. Therefore, a reversal connection protecting circuit is needed, which may overcome the inconvenience brought by substituting a fuse that is melted in a protecting circuit under the condition that the power supply of the protecting circuit is reversely connected in prior art.

According to an embodiment of the invention, a reversal connection protecting circuit is provided, comprising: a power supply interface, which may comprise a first positive terminal and a first negative terminal; a secondary battery, which may comprise a second positive terminal and a second negative terminal; a reversal connection driving unit coupled to the power supply interface, which may be configured to output driving signals while the first positive terminal and the first negative terminal may be reversed; and a power switching unit coupled to the reversal connection driving unit, which may be configured to switch the secondary battery to supply power according to the driving signal from the reversal connection driving unit.

According to an embodiment of the invention, the reversal connection driving unit may comprise a first current-limiting resistor and a protecting diode. One end of the first current-limiting resistor may be coupled to either of the first negative terminal and the first positive terminal, and the other end of the first current-limiting resistor may be coupled to the power switching unit. A cathode of the protecting diode may be coupled to the first positive terminal or the first negative terminal, and an anode of the protecting diode may be coupled to the power switching unit.

According to another embodiment of the invention, the power switching unit may comprise: a MOS transistor, a drain of which is coupled to the first positive terminal, and a source of which is coupled to the second positive terminal; a first divider resistor, which is connected between a gate of the MOS transistor and the source of the MOS transistor in parallel; a second divider resistor, with one end being coupled to the source of the MOS transistor; and a first photoelectric coupling unit comprising a first light emitting diode and a first phototransistor. An anode of the first light emitting diode is coupled to the first current-limiting resistor, a cathode of the first light emitting diode is coupled to the anode of the protecting diode, a collector of the first phototransistor is coupled to the second divider resistor, and an emitter of the first phototransistor is coupled to the second negative terminal.

According to some embodiments of the invention, the reversal connection protecting circuit further comprises an anti-reversal unit coupled to the power switching unit. In these embodiments, the anti-reversal unit comprises at least one of a first anti-reversal part and a second anti-reversal part.

According to an embodiment of the invention, the first anti-reversal part comprises a first diode. An anode of the first diode is coupled to the first positive, and a cathode of the first diode is coupled to the drain of the MOS transistor.

According to another embodiment of the invention, the second anti-reversal part comprises a second diode. An anode of the second diode is coupled to the second positive terminal, and a cathode of the second diode is coupled to the source of the MOS transistor.

According to some embodiments of the invention, the reversal connection protecting circuit further comprises a processing unit coupled to the reversal connection driving unit for processing the driving signals from the reversal connection driving unit; and a warning interface coupled to the processing unit for transferring the processed signals from the processing unit to the field monitoring device or remote monitoring device.

According to an embodiment of the invention, the processing unit comprises: a second photoelectric coupling unit comprising a second light emitting diode and a second phototransistor, a second current-limiting resistor, and a MCU (microprocessor control unit). An anode of the second light emitting diode is coupled to the first current-limiting resistor, a cathode of the second light emitting diode is coupled to the anode of the protecting diode. An emitter of the second phototransistor is grounded. An end of the second current-limiting resistor is coupled to the collector of the second phototransistor, and the other end of the same is coupled to the first positive terminal. A detecting pin of the MCU is coupled to the collector of the second phototransistor, a supply pin of the MCU is coupled to the first positive terminal, and a grounding pin of the MCU is grounded. In another embodiment, the processing unit further comprises a depressing voltage module coupled between the first positive terminal and the second current-limiting resistor.

According to an embodiment of the invention, the warning interface comprises a bus-line. An input interface of the bus-line is coupled to the output end of the processing unit, and the output interface of the bus-line is coupled to a field monitoring device or a remote monitoring device.

Additional aspects and advantages of the embodiments of present invention will be given in part in the following descriptions, become apparent in part from the following descriptions, or be learned from the practice of the embodiments present invention.

BRIEF DESCRIPTION OF THE DRAWINGS

These and other aspects and advantages of the invention will become apparent and more readily appreciated from the following descriptions taken in conjunction with the drawings in which.

DETAILED DESCRIPTION OF THE EMBODIMENTS

Figure 1:
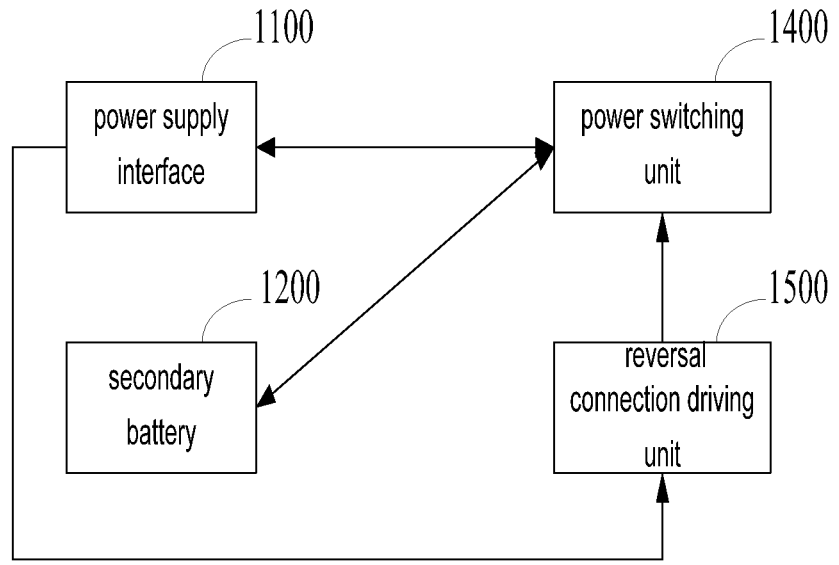
FIG. 1 shows a block diagram of a reversal connection protecting circuit according to an embodiment of the present invention.

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

FIG. 1 illustrates a reversal connection protecting circuit according to one embodiment of the invention, the circuit comprises: a power supply interface 1100, a secondary battery 1200, a power switching unit 1400 coupled to the power supply interface 1100 and the secondary battery 1200, and a reversal connection driving unit 1500 coupled to the power switching unit 1400.

When the interface 1100 is reversal connected, the unit 1500 may output driving signals to unit 1400; and then the unit 1400 can switch the battery 1200 to supply power for the reversal connection protecting circuit and other protecting circuits (not shown) according to the driving signals.

Figure 2:
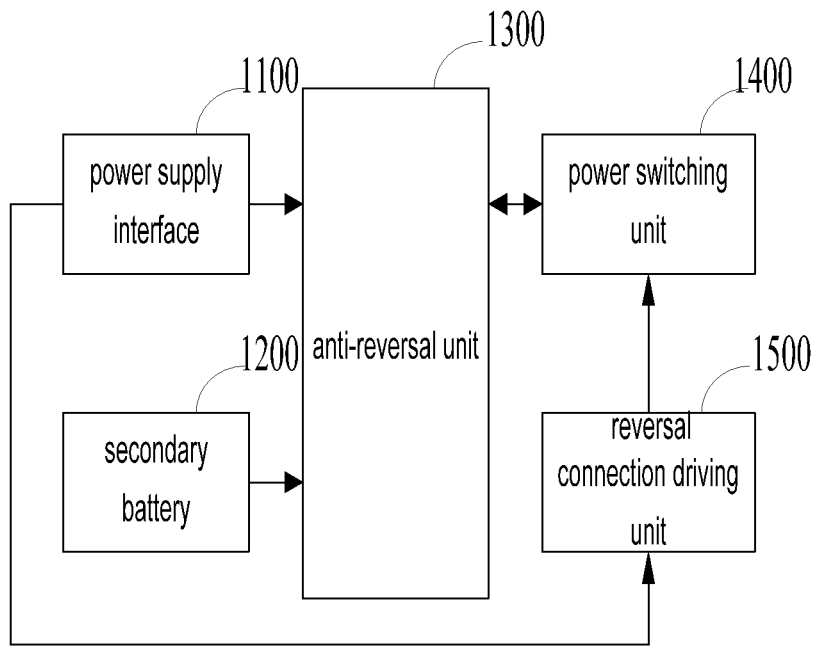
FIG. 2 shows a block diagram of a reversal connection protecting circuit according to another embodiment of the present invention.

As shown in FIG. 2, according to another embodiment of the invention, the reversal connection protecting circuit further comprises an anti-reversal unit 1300 coupled to the power switching unit 1400.

The unit 1300 can avoid the interaction between the interface 1100 and the battery 1200, if one of them is reversal connected.

Figure 3:
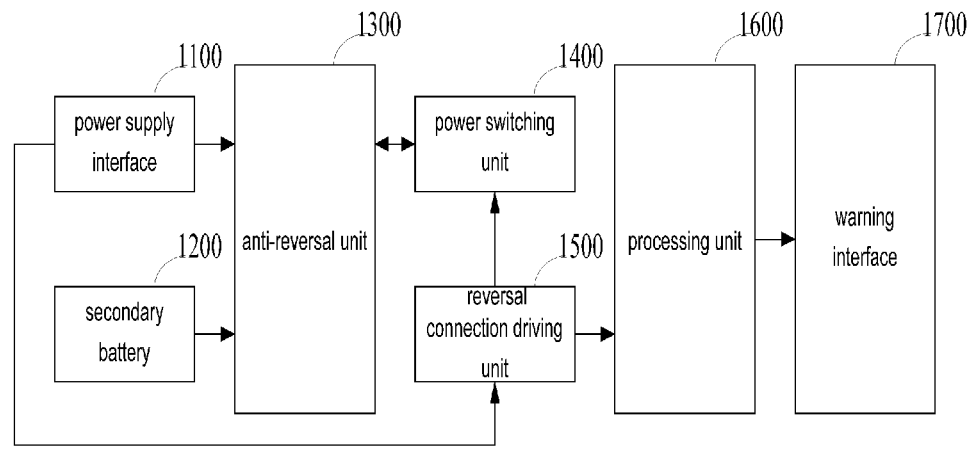
FIG. 3 shows a block diagram of a reversal connection protecting circuit according to yet another embodiment of the present invention.

As shown in FIG. 3, according to yet another embodiment of the invention, the reversal connection protecting circuit further comprises a processing unit 1600 and a warning interface 1700.

The unit 1600 is coupled to the unit 1500 for processing the driving signals from the unit 1500. The interface 1700 is coupled to the unit 1600 for transferring the processed signals from unit 1600 to a field monitoring device or a remote monitoring device (not shown). When the interface 1100 was reversely connected, the abnormal condition may be shown and be corrected promptly.

Figure 4:
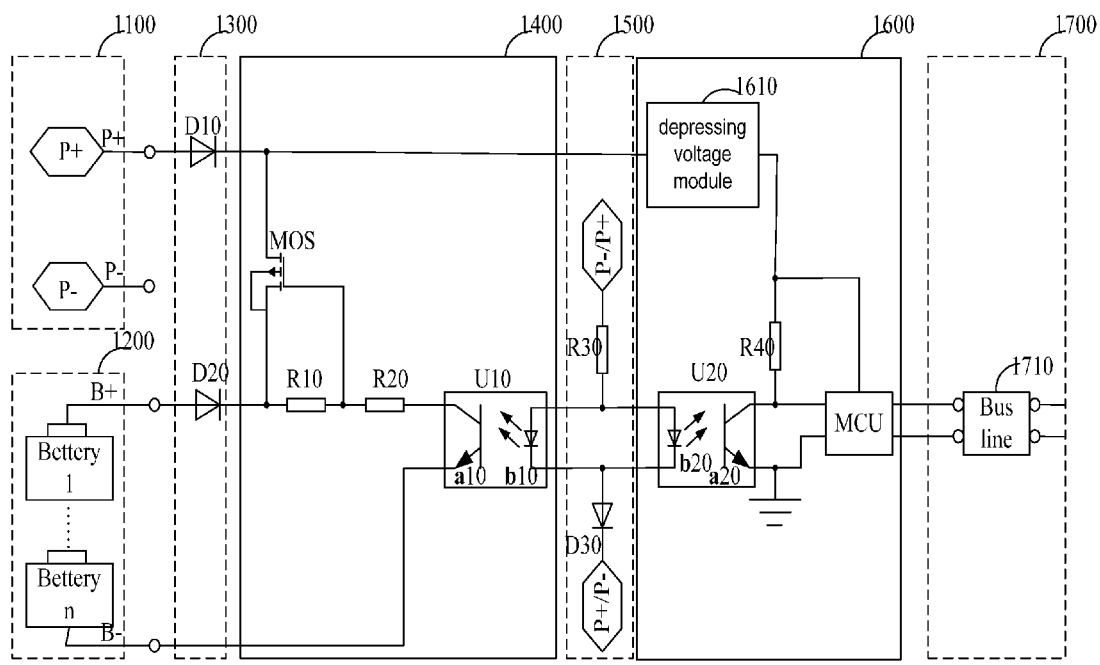
FIG. 4 shows a detailed circuit diagram of the reversal connection protecting circuit in FIG. 3.

FIG. 4 illustrates a circuit diagram of the reversal connection protecting circuit according to one embodiment of the present invention. As shown, the interface 1100 includes a first positive terminal P+ and a first negative terminal P−. The terminal P+ and P− provide interface for external power. The external power can supply power for the reversal connection protecting circuit and other protecting circuits (not shown). The battery 1200 includes n (n≥1) single batteries. The single batteries are series connected. The positive of battery 1 provides a second positive terminal B+, the negative of battery n provides a second negative terminal B−. The unit 1300 includes a first diode D10 and a second diode D20. The terminal P+ is coupled to the anode of the diode D10, the terminal B+ is coupled to the anode of the diode D20. The unit 1400 comprises a MOS transistor, the cathode of the diode D10 is coupled to the drain of the MOS transistor, and the cathode of the diode D20 is coupled to the source of the MOS transistor. In some embodiments, diode 10 or diode 20 can be removed, where terminal P+ is coupled to the drain of the MOS transistor, or terminal B+ is coupled to the source of the MOS transistor.

As shown in FIG. 4, the unit 1400 further comprises a first divider resistor R10, a second divider resistor R20, and a first photoelectric coupling unit U10. The unit U10 may comprise a first phototransistor a10 and a first light emitting diode b10. One end of the resistor R10 is coupled to the source of the MOS transistor, the other end of the resistor R10 is coupled to the gate of the MOS transistor and one end of the resistor R20. The other end of the resistor R20 is coupled to the collector of the phototransistor a10. The emitter of the phototransistor a10 is coupled to the terminal B−.

As shown in FIG. 4, the unit 1500 comprises a first current-limiting resistor R30, and a protecting diode D30. The anode of the diode b10 is coupled to one end of the resistor R30. The cathode of the diode b10 is coupled to the anode of the diode D30. Under normal condition (no reversal connected), the other end of the resistor R30 is coupled to the terminal P−, and the cathode of the diode D30 is coupled to the terminal P+.

The Unit 1600 and the interface 1700 are used to achieve early warning. As shown in FIG. 4, the unit 1600 comprises a second photoelectric U20 including a second phototransistor a20 and a second light emitting diode b20, a second current-limiting resistor R40, a MCU (Microprocessor Control Unit), and a depressing voltage module 1610. The interface 1700 comprises a bus-line 1710.

The diode b20 is connected to the diode b10 in parallel, the anode of the diode b20 is coupled to the anode of the diode b10, and the cathode of the diode b20 is coupled to the cathode of the diode b10. The collector of the phototransistor a20 is coupled to one end of the resistor R40 and the detecting pin of the MCU. The emitter of the phototransistor a20 is coupled to the grounding pin of the MCU, and grounded. The other end of the resistor R40 and the supply pin of the MCU are coupled to the cathode of the diode D10 via the module 1610. The module 1610 is used to depress voltage to supply power for the MCU. In some embodiments, the module 1610 can be removed. The output pins of the MCU are coupled to the input interface of the bus-line 1710, and the output interface of the bus-line 1710 is coupled to a field monitoring device or a remote monitoring device (not shown). In some embodiments, the bus-line 1710 can be any type of bus-lines. According to an embodiment of the invention, the bus-line 1710 can be CAN-bus-line.

The following provides details protecting principle of the reversal connection protecting circuit embodiments of the present invention.

Under normal conditions, the terminal P+ is coupled to the anode of the diode D10 and the cathode of the diode D30. Then the diode D10 is conducted, and the diode D30 is not conducted, the terminal P+ supplies power for the reversal connection protecting circuit and other protecting circuits. If the battery 1200 is reversed, the terminal B− is coupled to the anode of the diode D20, and the diode D20 is not conducted, it can avoid the conduction between the terminal P+ and the terminal B−, and avoid damage to the battery 1200.

When the interface 1100 is reversed, the terminal P− is coupled to the anode of the diode D10, and the diode D10 is not conducted, it can avoid the conduction between the terminal B+ and the terminal P−, and prevents the interface 1100 from being damaged. At the same time, the terminal P+ is coupled to the resistor R30, the terminal P− is coupled to the cathode of the diode D30, and then the unit U10 is conducted. Furthermore, the terminal B+, the diode D20, the resistor R10, the resistor R20, the unit U10 and the terminal B− are conducted. The resistances of the resistor R10 and the resistor R20 can be selected to achieve the partial voltage of the resistor R10 equal to the threshold voltage of the gate and drain of the MOS transistor. Then the drain and source of the MOS transistor are conducted, the terminal B+ is coupled to the power supply loop via the MOS transistor, and the battery 1200 supplies power for the reversal connection protecting circuit and other protecting circuits.

In addition, the unit U20 is conducted at the same time, and the voltage of the collector of the phototransistor a20 is changed from high-voltage to low-voltage. The MCU can receive and process the changed signal. Then the processed signal is transferred to the field monitoring device or the remote monitoring device via the bus-line 1710.

According to some embodiments of the present invention, the reversal connection protecting circuit can switch the secondary battery to supply power for the reversal connection protecting circuit and other protecting circuits when the power supply interface is reversed. There is no destructive action in the protecting process, and it needs no replacement of any part, so it is convenient for use. The anti-reversal unit can prevent the interaction between the power supply interface and secondary battery if one of them is reversely connected. Furthermore, the abnormal condition can be shown and be alarmed via the warning interface and the monitoring device, and then the technicians can correct it promptly.

Although explanatory embodiments have been shown and described, it would be appreciated by those skilled in the art that changes, alternatives, and modifications may be made in the embodiments without departing from spirit and principles of the invention. Such changes, alternatives, and modifications all fall into the scope of the claims and their equivalents.

What is claimed is:

1. A reversal connection protecting circuit, comprising:
    a power supply interface comprising a first positive terminal and a first negative terminal;
    a secondary battery comprising a second positive terminal and a second negative terminal;
    a reversal connection driving unit coupled to the power supply interface, the reversal connection driving unit configured to output driving signals while the first positive terminal and the first negative terminal are reversed, wherein the reversal connection diving unit comprises:
        a first current-limiting resistor, one end of the first current-limiting resistor coupled to one of the first negative terminal and the first positive terminal, and the other end of the first current-limiting resistor coupled to a power switching unit; and
        a protecting diode, a cathode of the protecting diode coupled to the other one of the first positive terminal and the first negative terminal, and an anode of the protecting diode coupled to the power switching unit; and
    the power switching unit coupled to the reversal connection driving unit, the power switching unit comprising:
        a MOS transistor having a drain, a source and a gate,
        a first divider resistor coupled between the gate and the source of the MOS transistor, wherein the power switching unit is configured to switch the secondary battery to supply power according to the driving signal from the reversal connection driving unit;
        a second divider resistor, wherein the gate of the MOS transistor is coupled to one end of the second divider resistor, and the drain of the MOS transistor is coupled to the first positive terminal, and the source of the MOS transistor is coupled to the second positive terminal; and
    a first photoelectric coupling unit, the first photoelectric coupling unit comprising a first light emitting diode and a first phototransistor, an anode of the first light emitting diode coupled to the first current-limiting resistor, and a cathode of the first light emitting diode coupled to the anode of the protecting diode, a collector of the first phototransistor coupled to the other end of the second divider resistor, an emitter of the first phototransistor coupled to the second negative terminal.

2. The reversal connection protecting circuit according to claim 1, further comprising an anti-reversal unit coupled to the power switching unit, wherein the anti-reversal unit comprises at least one of a first anti-reversal part and a second anti-reversal part,
    the first anti-reversal part comprises a first diode, an anode of the first diode coupled to the first positive terminal, and a cathode of the first diode coupled to the drain of the MOS transistor;
    the second anti-reversal part comprising a second diode, and an anode of the second diode coupled to the second positive terminal, and a cathode of the second diode coupled to the source of the MOS transistor.

3. The reversal connection protecting circuit according to claim 1 further comprising: a processing unit coupled to the reversal connection driving unit for processing the driving signals from the reversal connection driving unit; and
    a warning interface coupled to the processing unit for transferring the processed signals from the processing unit to a field monitoring device or a remote monitoring device.

4. The reversal connection protecting circuit according to claim 3, wherein the processing unit comprises:
    a second photoelectric coupling unit comprising a second light emitting diode and a second phototransistor, an anode of the second light emitting diode coupled to the first current-limiting resistor, a cathode of the second light emitting diode coupled to the anode of the protecting diode, and an emitter of the second phototransistor grounded;
    a second current-limiting resistor, one end of the second current-limiting resistor coupled to a collector of the second phototransistor, and the other end of the second current-limiting resistor coupled to the first positive terminal; and
    a microprocessor control unit, a detecting pin of the microprocessor control unit coupled to the collector of the second phototransistor, a supply pin of the microprocessor control unit coupled to the first positive terminal, and a grounding pin grounded.

5. The reversal connection protecting circuit according to claim 4, further comprising a depressing voltage module coupled between the first positive terminal and the second current-limiting resistor.

6. The reversal connection protecting circuit according to claim 3, wherein the warning interface comprises a bus-line with an input interface being coupled to an output end of the processing unit, and an output interface being coupled to the field monitoring device or the remote monitoring device.

7. A reversal connection protecting circuit comprising:
    a power supply interface comprising a first positive terminal and a first negative terminal;
    a secondary battery comprising a second positive terminal and a second negative terminal;
    a reversal connection driving unit coupled to the power supply interface, which is configured to output driving signals while the first positive terminal and the first negative terminal are reversed, wherein the reversal connection driving unit comprises:
   a first current-limiting resistor, one end of the first current-limiting resistor coupled to one of the first negative terminal and the first positive terminal, and the other end of the first current-limiting resistor coupled to a power switching unit; and
   a protecting diode, a cathode of the protecting diode coupled to the other one of the first positive terminal and the first negative terminal, and an anode of the protecting diode coupled to the power switching unit; and
the power switching unit coupled to the reversal connection driving unit, the power switching unit comprising:
   a MOS transistor having a drain, a source and a gate,
   a first divider resistor, one end of the first divider resistor coupled to the gate of the MOS transistor, and a second divider resistor, one end of the second divider resistor coupled to the gate of the MOS transistor,
   wherein the power switching unit is configured to switch the secondary battery to supply power according to the driving signal from the reversal connection driving unit;
   a first photoelectric coupling unit comprising a first light emitting diode, an anode of the first light emitting diode coupled to the first current-limiting resistor, and a cathode of the first light emitting diode coupled to the anode of the protecting diode; and
   a first phototransistor, a collector of the first phototransistor coupled to the other end of the second divider resistor, and an emitter of the first phototransistor coupled to the second negative terminal, wherein the drain of the MOS transistor is coupled to the first positive terminal, the source of the MOS transistor is coupled to the second positive terminal and the other end of the first divider resistor.

8. The reversal connection protecting circuit according to claim 7, further comprising an anti-reversal unit coupled to the power switching unit, wherein the anti-reversal unit comprises at least one of a first anti-reversal part and a second anti-reversal part,
   the first anti-reversal part comprising a first diode, an anode the first diode coupled to the first positive terminal, and a cathode the first diode coupled to the drain of the MOS transistor;
   the second anti-reversal part comprising a second diode, an anode of the second diode coupled to the second positive terminal and a cathode of the second diode coupled to the source of the MOS transistor.

9. A reversal connection protecting circuit comprising:
a power supply interface comprising a first positive terminal and a first negative terminal; a secondary battery comprising a second positive terminal and a second negative terminal;
a reversal connection driving unit coupled to the power supply interface and configured to output driving signals while the first positive terminal and the first negative terminal are reversed, wherein the reversal connection driving unit comprises:
   a first current-limiting resistor, one end of the first current-limiting resistor coupled to one of the first negative terminal and the first positive terminal and the other end of the first current-limiting resistor coupled to a power switching unit; and
   a protecting diode, a cathode of the protecting diode coupled to the other one of the first positive terminal and the first negative terminal, and an anode of the protecting diode coupled to the power switching unit;
the power switching unit coupled to the reversal connection driving unit, the power switching unit comprising:
   a MOS transistor having a drain, a source and a gate,
   a first divider resistor coupled between the gate and the source of the MOS transistor,
   wherein the power switching unit is configured to switch the secondary battery to supply power according to the driving signal from the reversal connection driving unit;
   a second divider resistor;
   a first photoelectric coupling unit comprising: a first light emitting diode, an anode of the first light emitting diode coupled to the first current-limiting resistor and a cathode of the first light emitting diode coupled to the anode of the protecting diode; and
   a first phototransistor, a collector of the first phototransistor coupled to one end of the second divider resistor, an emitter of the first phototransistor coupled to the second negative terminal, wherein the gate of the MOS transistor is coupled to one end of the second divider resistor, the drain of the MOS transistor is coupled to the first positive terminal, and the source of the MOS transistor is coupled to the second positive terminal;
an anti-reversal unit coupled to the power switching unit;
a processing unit coupled to the reversal connection driving unit for processing the driving signals from the reversal connection driving unit; and
a warning interface coupled to the processing unit for transferring the processed signals from the processing unit to a field monitoring device or a remote monitoring device.

10. The reversal connection protecting circuit according to claim 9, wherein the anti-reversal unit comprises at least one of a first anti-reversal part and a second anti-reversal part,
   the first anti-reversal part comprising a first diode, an anode of the first diode coupled to the first positive terminal, a cathode of the first diode coupled to the drain of the MOS transistor;
   the second anti-reversal part comprising a second diode, an anode of the second diode coupled to the second positive terminal, a cathode of the second diode coupled to the source of the MOS transistor.

11. The reversal connection protecting circuit according to claim 9, wherein the processing unit comprises:
   a second photoelectric coupling unit comprising a second light emitting diode, an anode of the second light emitting diode coupled to the first current-limiting resistor, a cathode of the second light emitting diode coupled to the anode of the protecting diode; and a second phototransistor having an emitter grounded;
   a second current-limiting resistor, one end of the second current-limiting resistor coupled to the collector of the second phototransistor, and the other end of the second current-limiting resistor coupled to the first positive terminal; and
   a microprocessor control unit, a detecting pin of the microprocessor control unit coupled to the collector of the second phototransistor, a supply pin of the microprocessor control unit coupled to the first positive terminal, and a grounding pin of the microprocessor control unit grounded.

12. The reversal connection protecting circuit according to claim 11, wherein the processing unit further comprises a depressing voltage module coupled between the first positive terminal and the second current-limiting resistor.

13. The reversal connection protecting circuit according to claim 9, wherein the warning interface comprises a bus-line, an input interface of the warning interface coupled to the output end of the processing unit, and an output interface of the warning interface coupled to one of the field monitoring device and the remote monitoring device.

\* \* \* \* \*

UNITED STATES PATENT AND TRADEMARK OFFICE
CERTIFICATE OF CORRECTION

PATENT NO. : 8,953,291 B2  
APPLICATION NO. : 13/059638  
DATED : February 10, 2015  
INVENTOR(S) : Yaozhong Mi et al.

Page 1 of 1

It is certified that error appears in the above-identified patent and that said Letters Patent is hereby corrected as shown below:

Title page,

"(30)    Foreign Application Priority Data

Sep. 9, 2008  (CN)..........2008 2 0147332 U"

should read

--(30)    Foreign Application Priority Data

Sep. 9, 2008  (CN)..........200820147332.2--

Signed and Sealed this
Fourteenth Day of July, 2015

Michelle K. Lee
*Director of the United States Patent and Trademark Office*